A. SCOTTI.
TRACTION WHEEL.
APPLICATION FILED JAN. 19, 1920.
1,360,451.
Patented Nov. 30, 1920.
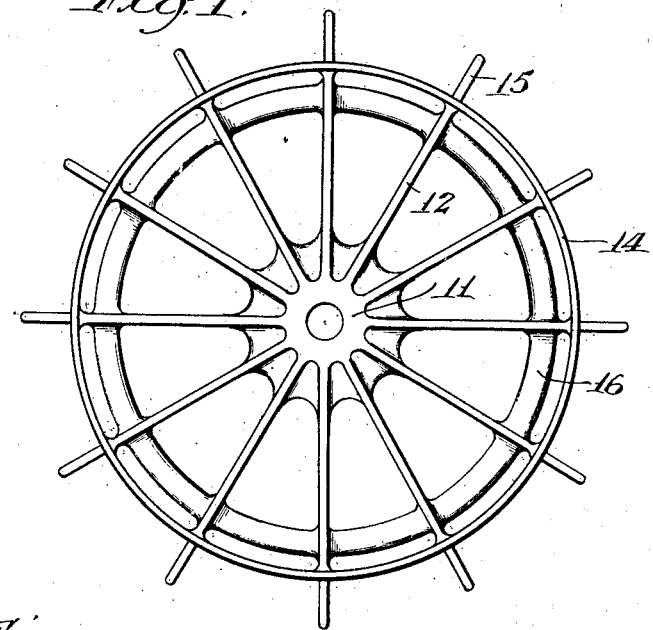
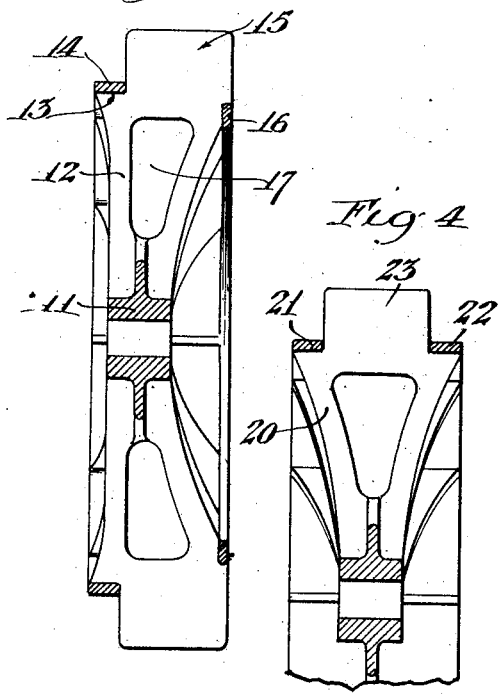
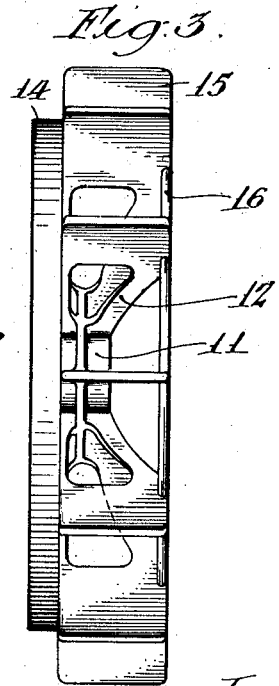
Inventor
Alfredo Scotti
by Graham & Harris
Attorneys

UNITED STATES PATENT OFFICE.

ALFREDO SCOTTI, OF WHITTIER, CALIFORNIA.

TRACTION-WHEEL.

1,360,451.  Specification of Letters Patent.  Patented Nov. 30, 1920.

Application filed January 19, 1920. Serial No. 352,608.

*To all whom it may concern:*

Be it known that I, ALFREDO SCOTTI, a subject of the King of Italy, who have declared my intention of becoming a citizen of the United States, residing at Whittier, in the county of Los Angeles and State of California, have invented new and useful Traction-Wheels, of which the following is a specification.

My invention relates to traction vehicles, being more particularly a traction wheel for traction vehicles such as are used for hauling farm implements of various kinds. Vehicles of this kind are used for different kinds of work upon ground of various types, that is, the same vehicle may be required to pull a load over sandy soil, heavy soil, and in some cases where the surface is hard.

The principal object of my invention is to provide a traction wheel of the class described which will be efficient when used upon any of the various types of ground.

Other objects and advantages will be made evident hereinafter from the following description.

Referring to the drawings which are for illustrative purposes only,

Figure 1 is a side elevation of a traction wheel embodying a form of my invention.

Fig. 2 is a vertical sectional view of the wheel shown in Fig. 1.

Fig. 3 is an end view of the wheel shown in Fig. 1, and

Fig. 4 is a vertical sectional view of half of the wheel, showing a modified form of my invention.

The wheel, in the form shown, is made of a single casting, but it is understood that the parts of the wheel may be made separately and secured together in any of the well known common practices in making similar devices. The wheel consists of a hub 11 and a series of radially extending spokes 12, which spokes are in the form of flat plates having a shoulder 13 thereon upon which is seated a rim 14. The spokes are disposed almost wholly to one side of the rim 14, the rim being on the inner side of the wheel. The spokes 12 each extend beyond the rim, such extended portion 15 of each spoke forming a flight or traction means for engaging the ground. On the outer side of the spokes is preferably arranged a bar or bridge 16 forming a rib of less diameter than the rim connecting the spokes for the purpose of strengthening the same. Each spoke is preferably cut away as indicated at 17 for the purpose hereinafter described.

In the form shown in Fig. 4 the spokes 20 support two rims 21 and 22, the spokes having an extension 23 which extends beyond the rims and forms the flights for the wheel. In using wheels of the construction above described the flights 15 extend into the ground varying depths according to the character of the ground. In the ordinary ground found in orchards and the like the flights extend into the ground and almost wholly support the weight of the vehicle, the rim 14, however, riding upon the surface of the ground thereby preventing a too great penetration of the flights into the surface of the ground.

Where the ground is sticky and wet, in ordinary types of traction wheels there is a tendency for such ground to pack between the flights upon the rim of the wheel and in a very short time the spaces between the flights are almost entirely filled with the packed dirt and the wheel assumes the shape of an ordinary flat rim thereby destroying the traction efficiency of the wheel. In using my wheel above described in such ground, however, there is no opportunity for the dirt to pack between the flights as the space between the flights is entirely clear, the dirt passing between the flights, and should the dirt extend farther into the wheel between the spokes it readily drops when the wheel reaches its highest point. The openings 17 in the spokes also permit any accumulation of dirt between the spokes to fall away thereby preventing an accumulation of dirt between the spokes.

What I claim is:—

1. A traction wheel comprising a hub, a rim, and a series of spokes consisting of flat transversely disposed members extending beyond the rim.

2. A traction wheel comprising a hub, a rim, and a series of spokes consisting of flat members extending beyond the rim, said rim being at the side of the extended portion of said spokes and narrow in proportion to the width of the extended portion of the spokes.

3. A traction wheel comprising a hub, a plurality of spokes terminating at their outer ends in flat plates forming flights, and a rim at the side of said flights.

4. In a traction wheel, a hub, a rim, spokes connecting said rim to the hub, and a series of flights at one side of said rim extending outwardly therefrom.

5. In a traction wheel, a hub, a rim, a series of flat spokes extending between said hub and rim, transversely disposed flat portions on said spokes extending beyond the rim at one side thereof, and a rib of less diameter than said rim connecting said spokes on the side thereof opposite to the rim.

In testimony whereof, I have hereunto set my hand at Los Angeles, California, this 10th day of January, 1920.

ALFREDO SCOTTI.